3,631,106
NOVEL NAPHTHALENEDIAMINE COMPOUNDS
AND MEANS FOR THEIR PRODUCTION
Edward F. Elslager, 4081 Thornoaks Drive,
Ann Arbor, Mich. 48104
No Drawing. Filed Nov. 18, 1968, Ser. No. 776,799
Int. Cl. C07c 119/00
U.S. Cl. 260—566 F        5 Claims

ABSTRACT OF THE DISCLOSURE

Naphthalenediamine compounds of Formula I are provided by reacting N-[2-(diethylamino)ethyl]-1,4-naphthalenediamine with the appropriate aldehyde OA, specifically: (a) o-nitrocinnamaldehyde, (b) 4-dimethylaminocinnamaldehyde or (c) benzaldehyde monosubstituted by halogen, $CH_3CONH$, $NO_2$, CN, $CH_3$ or OH and optionally containing 1 or 2 substituents selected from Cl, $CH_3$ and $CH_3O$. The products have antiparasitic properties and are useful schistosomacides.

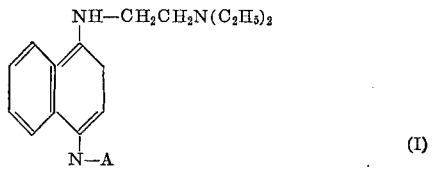

(I)

SUMMARY AND DETAILED DESCRIPTION

The present invention relates to novel naphthalenediamine compounds that are useful as pharmacological agents and means for their production. More particularly, the invention relates to naphthylaminediamine compounds having in free base form the formula

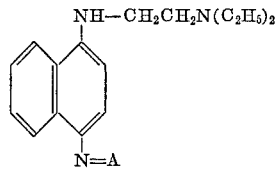

where A is an o-nitrochinnamylidene or p-dimethylaminocinnamylidene group or a benzylidene group of formula

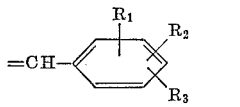

where $R_1$ is halogen, $CH_3CONH$, $NO_2$, CN, $CH_3$ or OH and $R_2$ and $R_3$ are the same or different and represent H, Cl, $CH_3$ or $CH_3O$.

In accordance with the invention the compounds are produced by reacting N-[2-(diethylamino)ethyl]-1,4-naphthalenediamine, respectively, with o-cinnamaldehyde or -dimetylaminocinnamaldehyde of with a benzaldehyde of formula

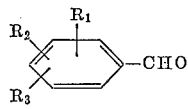

where $R_1$, $R_2$ and $R_3$ are the same as defined above. The reaction is carried out preferably in a non-reactive water-immiscible solvent. Suitable solvents, for example, are hydrocarbons such as benzene, toluene and xylene; chlorinated hydrocarbons such as chloroform and trichloroethane; ethers such as diisopropyl ether and dibutyl ether; and mixtures of such solvents. A preferred solvent is xylene. Equivalent quantities of reactants are preferred, although a slight excess of either reactant may be used if desired. The reaction conditions are subject to variation. Temperatures in the range from about 30–200° C. for periods from about 1 to 24 hours may be used. Perferably the reaction is carried out in the range from about 130–145° C. for about 2 to 5 hours. The product is isolated from the reaction mixture conveniently as the free base. Suitable methods of isolation include evaporation of the solvent, concentration and crystallization or precipitation with a suitable solvent in which the product is relatively insoluble. Although the product may be isolated in salt form, such salts are susceptible to hydrolysis.

The compounds of the invention are useful as chemotherapeutic agents, especially as antiparasitic agents and particularly as schistosomacides. Their antiparasitic activity can be demonstrated and quantitatively measured in standard tests against the schistosome species Schistosoma mansoni.

In the test used to determine schistosomacidal activity, female Stout mice weighing 13–15 grams each are infected intraperitoneally with 75 S. mansoni (Puerto Rican strain) cercariae (from the snail host Australorbis glabratus) six weeks prior to treatment. The experimental groups usually consist of 5 to 10 mice, while the sham-dosed control groups number 10 to 15 mice per experiment. All of the mice are fed Rockland mouse food from the time of infection to autopsy. The test compounds are administered in the diet or by gavage. Following treatment for a measured period, the animals are killed and autopsied and the activity of the test compound is evaluated primarily on the basis of the distribution and number of living and dead worms in the liver, portal veins, and mesenteric veins. This activity is then expressed in terms of the percentage of schistosomes found killed after the period of treatment at a given dosage level, which is expressed either as a percentage of the diet or in mg./kg./day when administration is by gavage. The activities of compounds of the invention, as deteremined by this test procedure, are shown in the table that follows.

The compounds in the table are identified by reference to the examples that follow, where the preparation of each is described.

SCHISTOMACIDAL ACTIVITY

| | Percent schistosomes dead at— | |
|---|---|---|
| Compound | Percent mouse diet for number of days | Gavage dose (mg./kg./day) for number of days |
| Example: | | |
| 1 | 79/0.0625/14 | |
| 2 | 59/0.0625/14 | |
| 4 | | 75/100/5 |
| 5 | 100/0.125/14 | |
| 6 | 100/0.25/14 | |
| 7 | 100/0.125/14 | |
| 9 | | 24/50/5 |
| 10 | 100/0.25/14 | |
| 11 | 94/0.0625/14 | |
| 13 | 67/0.0625/14 | |
| 14 | 100/0.25/14 | |
| 15 | 19/0.0625/14 | |
| 16 | 69/0.0625/14 | |

Example 1

A solution of 8.4 g. of N-[2-(diethylamino)ethyl]-1,4-naphthalenediamine dihydrochloride in ice water is made basic with ammonium hydroxide and extracted with about 600 ml. of xylene. The extract is heated under reflux for 0.5 hour under a water separator to remove any water present. To the warm solution is added a warm solution of 5 g. of 2,4,5-trichlorobenzaldehyde in 150 ml. of xylene and the mixture is heated under reflux for 3 hours under a water separator. Petroleum ether is added to the cooled reaction mixture and the solid is removed by filtration and recrystallized from acetonitrile to give the product N-[2-(diethylamino)ethyl] - N' - (2,4,5-trichlorobenzylidene)-1,4-naphthalenediamine; M.P. 110–112° C.

Further examples of the preparation of other compounds of the invention, by a similar procedure using appropriate related starting materials, are the following:

Example 2

N-(4-chloro - 3 - nitrobenzylidene)-N'-[2-(diethylamino)ethyl-1,4-naphthalenediamine; from 5.5 g. of N-[2-(diethylamino)ethyl] - 1,4 - naphthalenediamine dihydrochloride and 2.99 g. of 4-chloro-3-nitrobenzaldehyde; M.P. 92–95° from ethanol-ether.

Example 3

N-(5-chloro - 2 - nitrobenzylidene)-N'-[2-(diethylamino)ethyl]-1,4-naphthalenediamine; from 14.8 g. of N-[2-(diethylamino)ethyl] - 1,4 - naphthalenediamine dihydrochloride and 8 g. of 5-chloro-2-nitrobenzaldehyde; M.P. 111–115° from ethanol-ether.

Example 4

N-(2,4-dichlorobenzylidene - N'-[2-(diethylamino)ethyl]-1,4-naphthalenediamine; from 21.8 g. of N-[2-(diethylamino)ethyl]-1,4 - naphthalenediamine dihydrochloride and 11.7 g. of 2,4-dichlorobenzaldehyde; M.P. 60–65° after washing with petroleum ether.

Example 5

N-(2,6-dichlorobenzylidene) - N' - [2 - (diethylamino) ethyl]-1,4-naphthalenediamine; from 21.8 g. of N-[2-(diethylamino)ethyl]-1,4 - naphthalenediamine dihydrochloride and 11.7 g. of 2,6-dichlorobenzaldehyde; M.P. 63–67° after recrystallization from petroleum ether.

Example 6

4,6-dichloro - α - [[4-[[2-(diethylamino)ethyl]amino]-1-naphthyl]imino]-o-cresol; from 16.5 g. of N-[2-(diethylamino)ethyl]-1,4 - naphthalenediamine dihydrochloride and 9.55 g. of 3,5-dichlorosalicylaldehyde; M.P. 93–96° after precipitation from the xylene with 2,2,4-trimethylpentane.

Example 7

N-(p-bromobenzylidene) - N - [2 - (diethylamino)ethyl]-1,4 - naphthalenediamine; from 18 g. of N-[2-(diethylamino)ethyl] - 1,4 - naphthalenediamine dihydrochloride and 9.3 g. of p-bromobenzaldehyde; M.P. 76–78° after removing the xylene in vacuo and recrystallizing from petroleum ether (B.P. 40–60°).

Example 8

N-[2-(diethylamino)ethyl] - N'-(o-fluorobenzylidene)-1,4-naphthalenediamine; from 8.3 g. of N-[2-(diethylamino)ethyl]-1,4-naphthalenediamine dihydrochloride and 3 g. of o-fluorobenzaldehyde; M.P. 75–77° after precipitation with petroleum ether (B.P. 40–60°).

Example 9

N-[2-(diethylamino)ethyl] - N'-(p-fluorobenzylidene)-1,4-naphthalenediamine; from 8.3 g. of N-[2-(diethylamino)ethyl]-1,4-naphthalenediamine dihydrochloride and 3 g. of p-fluorobenzaldehyde; M.P. 70–72° after precipitation with petroleum ether (B.P. 40–60°).

Example 10

α-[[4-[[2-(diethylamino)ethyl]amino] - 1 - naphthyl]imino]-p-acetotoluidide; from 16.5 g. of N-[2-(diethylamino)ethyl] - 1,4 - naphthalenediamine dihydrochloride and 8.2 g. of p-acetamidobenzaldehyde; M.P. 137–140° after recrystallization from a mixture of benzene and petroleum ether (B.P. 40–60°).

Example 11

N-[2-(diethylamino)ethyl] - N' - (o-nitrobenzylidene)-1,4-naphthalenediamine; from 16.5 g. of N-[2-(diethylamino)ethyl] - 1,4 - naphthalenediamine dihydrochloride and 7.5 g. of o-nitrobenzaldehyde; M.P. 82–83° from a mixture of 2-propanol and petroleum ether (B.P. 40–60°).

Example 12

N-[2-(diethylamino)ethyl] - N' - (p-nitrobenzylidene)-1,4-naphthalenediamine; from 5.5 g. of N-[2-(diethylamino)ethyl]-1,4-naphthalenediamine dihydrochloride and 2.5 g. of p-nitrobenzaldehyde; M.P. 119–121° after washing with petroleum ether (B.P. 40–60°).

Example 13

α-[[4-[[2-(diethylamino)ethyl]amino] - 1 - naphthyl]imino]-p-tolunitrile; from 11 g. of N-[2-(diethylamino)ethyl]-1,4-naphthalenediamine dihydrochloride and 4.2 g. of p-cyanobenzaldehyde; M.P. 86–90° after washing with petroleum ether (B.P. 40–60°).

Example 14

α-[[4-[[2-(diethylamino)ethyl]amino] - 1 - naphthyl]imino]creosol; from 16.5 g. of N-[2-(diethylamino)ethyl]-1,4-naphthalenediamine dihydrochloride and 7.1 g. of vanillin; M.P. 134–137° after washing with petroleum ether (B.P. 40–60°).

Example 15

N-[2-(diethylamino)ethyl] - N' - (4,5-dimethoxy-2-nitrobenzylidene)-1,4-naphthalenediamine; from 12.7 g. of N-[2-(diethylamino)ethyl] - 1,4 - naphthalenediamine dihydrochloride and 8 g. of 4,5-dimethoxy-2-nitrobenzaldehyde; M.P. 114–116° after recrystallization from dilute ethanol.

Example 16

N-[2-(diethylamino)ethyl] - N' - (2,4,6-trimethylbenzylidene)-1,4-naphthalenediamine; from 5.5 g. of N-(2-diethylaminoethyl)-1,4 - naphthalenediamine dihydrochloride and 2.4 g. of 2,4,6-trimethylbenzaldehyde; M.P. 65–70° after precipitation with ethyl ether.

Example 17

N - [2 - (diethylamino)ethyl] - N' - (o-nitrocinnamylidene)-1,4-naphthalenediamine; from 5.5 g. of N-[2-(diethylamino)ethyl]-1,4 - naphthalenediamine dihydrochloride and 2.8 g. of o-nitrocinnamaldehyde; M.P. 99–102° after washing with petroleum ether (B.P. 40–60°).

Example 18

N-[2-(diethylamino)ethyl] - N' - (p-dimethylaminocinnamylidene)-1,4-naphthalenediamine; from 16.5 g. of N-[2-(diethylamino)ethyl]-1,4-naphthalenediamine dihydrochloride and 8.76 g. of 4-dimethylaminocinnamaldehyde; M.P. 146–148° (sintering from 133°) after washing with petroleum ether (B.P. 40–60°).

I claim:
1. A naphthalenediamine compound having in free base form the formula

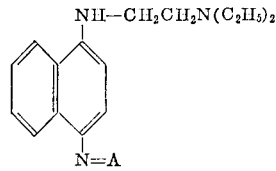

where A is a benzylidene group of formula

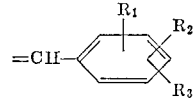

where $R_1$ is halogen, $CH_3CONH$, $NO_2$, $CN$, $CH_3$ or $OH$ and $R_2$ and $R_3$ are the same or different and represent H, Cl, $CH_3$ or $CH_3O$.

2. N - [2 - (diethylamino)ethyl] - N' - (2,4,5-trichlorobenzylidene)-1,4-naphthalenediamine.

3. N - (p - bromobenzylidene) - N - [2 - (diethylamino) ethyl]-1,4-naphthalenediamine.

4. N-[2-(diethylamino)ethyl]-N'-(o-nitrobenzylidene)-1,4-naphthalenediamine.

5. N-[2,4-dichlorobenzylidene)-N'-[2-(diethylamino)ethyl]-1,4-naphthalenediamine.

References Cited

UNITED STATES PATENTS

| | | | |
|---|---|---|---|
| 1,864,067 | 6/1932 | Howland | 260—566 |
| 2,155,356 | 4/1939 | Britton et al. | 260—566 |
| 3,041,165 | 6/1962 | Süs et al. | 96—1 |
| 3,483,162 | 12/1969 | Kovacic | 260—47 |

LEON ZITVER, Primary Examiner

G. A. SCHWARTZ, Assistant Examiner

U.S. Cl. X.R.

260—465 E, 562 P, 999